United States Patent
Janko

Patent Number: 6,075,561
Date of Patent: Jun. 13, 2000

[54] LOW DUTY-CYCLE TRANSPORT OF VIDEO REFERENCE IMAGES

[75] Inventor: Bozidar Janko, Portland, Oreg.

[73] Assignee: Tektronix, Inc., Beaverton, Oreg.

[21] Appl. No.: 09/026,758

[22] Filed: Feb. 20, 1998

[51] Int. Cl.[7] .................................................. H04N 17/00
[52] U.S. Cl. ............................................ 348/180; 348/192
[58] Field of Search .................................... 348/180, 192, 348/558, 725, 184, 193; H04N 17/00

[56] References Cited

U.S. PATENT DOCUMENTS 5,818,520  10/1998  Janko  ....................................... 348/192

*Primary Examiner*—Sherrie Hsia
*Attorney, Agent, or Firm*—Francis I. Gray

[57] ABSTRACT

In a system for measuring the quality of a received video sequence with respect to an original video sequence a low duty-cycle transport of video reference images from the original video sequence is used to transmit full quality images. Such a reference frame from the original video sequence is selected and transmitted as a full quality video image, either separately or as part of the transmission of the original video sequence after processing. The processed original video sequence becomes a received video sequence at a receiver, and the frame corresponding to the reference frame is extracted and compared with the full quality received reference frame to obtain a measure of the quality of the received video sequence.

2 Claims, 1 Drawing Sheet

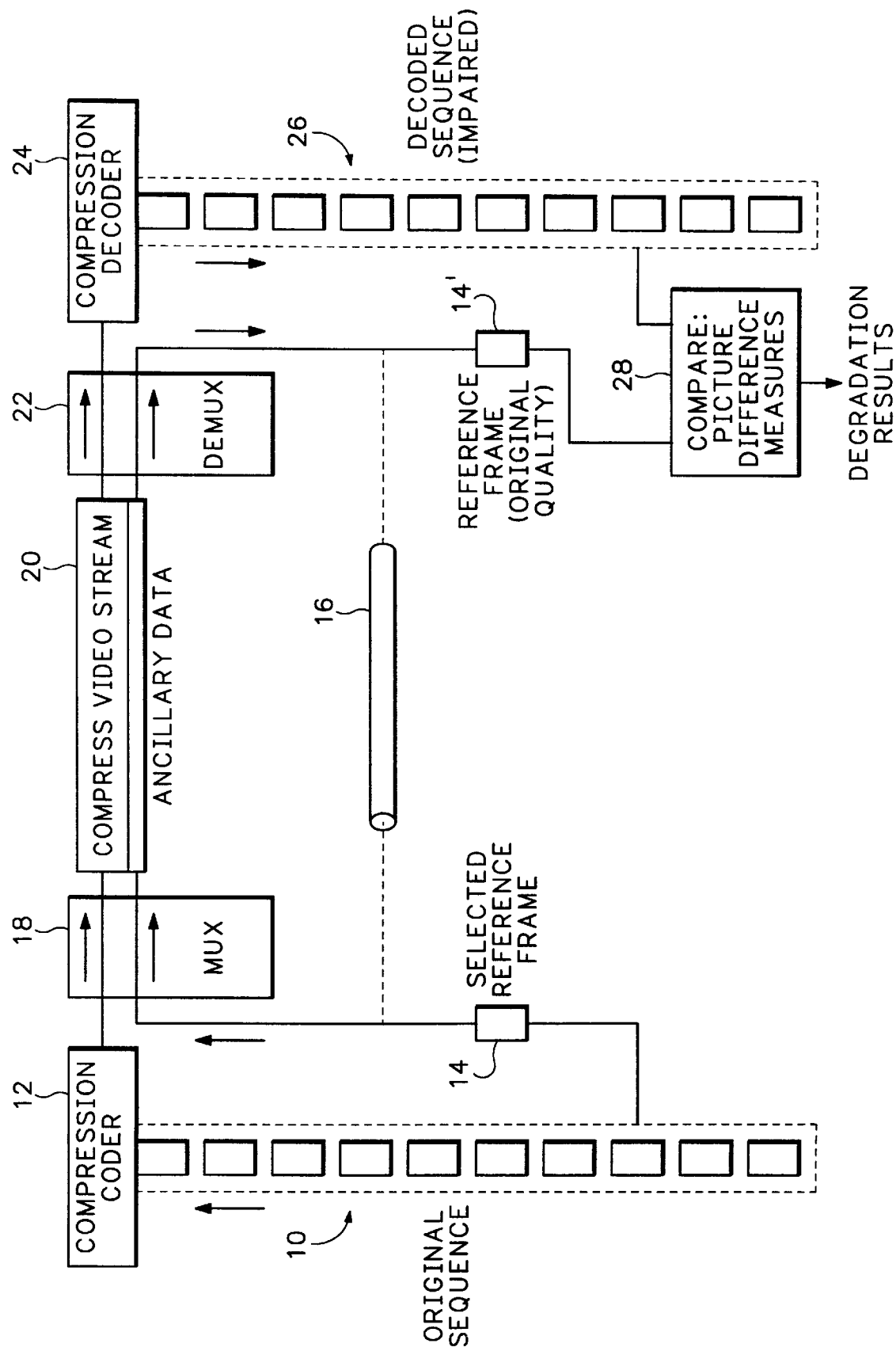

LOW DUTY-CYCLE TRANSPORT OF VIDEO REFERENCE IMAGES

CROSS-REFERENCE TO RELATED APPLICATIONS

Not applicable

REFERENCE TO GOVERNMENT SPONSORED RESEARCH OR DEVELOPMENT

Not applicable

BACKGROUND OF THE INVENTION

The present invention relates to television measurement of digital video signals, and more particularly to a low duty-cycle transport of a video reference image to a remote location for comparison with a corresponding degraded video image.

Objective measurement of video sequence degradation is done by comparing video frames of an original video sequence that have been transmitted to the corresponding frames of the video sequence that have been received with impairments, as is disclosed in allowed U.S. patent application Ser. No. 08/605,241 filed by Bozidar Janko on Feb. 12, 1996, U.S. Pat. No. 5,818,520, entitled "Programmable Instrument for Automatic Measurement of Compressed Video Quality." There is a difficulty when the transmitting and receiving sites are physically separated. When known test sequences are being used, this difficulty is resolved by maintaining an exact copy of the original video sequence to be transmitted at the receiving site. However when comparison of arbitrary sequences is desired, some other means is needed to deliver the frames of the original video sequence at the transmitting end to the receiving end.

What is desired is a method of transmitting selected frames of an original video sequence to a receiving site at full quality so that they may be compared with the corresponding received frames transmitted at normal transmission bit rates to determine degradation.

SUMMARY OF THE INVENTION

Accordingly the present invention provides for low duty-cycle transport of video images to a receiving site, either as ancillary data in a digital transport stream together with the original video sequence of frames or through independent transmission links. A look ahead process is used to select a frame from the original video sequence as a reference frame. The reference frame is transmitted at low duty-cycle, full quality in parallel with the original video sequence. At the receiving site the reference frame is extracted from the transmission medium and reconstructed, and then compared with the corresponding frame in the impaired video sequence received at the receiving site. The reference frame and corresponding received impaired frame may be compared to determine the amount of degradation of the original video sequence between the original video sequence source and the receiving site.

The objects, advantages and other novel features of the present invention are apparent from the following detailed description when read in conjunction with the appended claims and attached drawing.

DESCRIPTION OF THE SEVERAL VIEWS OF THE DRAWING

FIG. 1 is a conceptual block diagram view of a system for low duty-cycle transport of video reference images according to the present invention.

DETAILED DESCRIPTION OF THE INVENTION

Referring now to FIG. 1 an original video sequence 10 from a source (not shown), such as a camera, satellite, tape, disk recorder or the like, is input to a video processor 12, such as a video compression encoder. Looking ahead a frame is selected from the original video sequence 10 as a reference frame 14. The reference frame 14, in digitized form, may be transmitted over a conventional transmission medium 16, such as a telephone line, satellite medium or the like, at low duty-cycle rates to preserve full quality. Alternatively the reference frame 14 may be inserted at low duty-cycle rates into the processed video from the video processor 12 as ancillary data by a suitable multiplexer 18 or the like. The combination of the processed video sequence and ancillary data are again transmitted at normal bit rates over a suitable medium 20, such as a telephone line, satellite link or the like.

At the receive end the combination processed video sequence and ancillary data are separated by a suitable demultiplexer 22 and the ancillary data is converted into the reference frame 14' at the original quality. If transmitted separately, the reference frame 14' is captured from the transmission medium 16. The processed video sequence is input to an inverse video processor 24, such as a video compression decoder, to recover a received video sequence 26 that is an impaired version of the original video sequence 10. The received reference frame 14' and the corresponding frame from the received video sequence 26 are input to a picture quality measurement device 28, such as described in the above-mentioned allowed U.S. patent application Ser. No. 08/605,241, U.S. Pat. No. 5,818,520. The output from the measurement device 28 is a measure of the quality degradation of the received video sequence with respect to the original video sequence.

The reference frame 14 at the source is chosen far enough ahead so that the low duty-cycle, full quality transmission from the transmitter to the receiver is completed prior to the time when the same frame, travelling the normal transmission path, arrives at the measurement device 28. The reference frame 14 may be chosen to be a predetermined number of frames after a scene change in the original video sequence as determined by a scene change detector (not shown), which scene change is also readily detectable at the receiver, as is well known in the art. The reference frame 14 may be chosen based upon complexity of the video image occurring after a predetermined number of frames after the scene change to provide a measure of the greatest degradation over the normal transmission path. Also the reference frame 14 may actually be a series of frames occurring a predetermined interval apart so that the measurement device 28 may provide an averaged video quality measure for the received video sequence. For example where the compression ratio is 10:1, the eleventh frame after a scene change and every tenth frame thereafter may be chosen as the reference frames 14. Other means for identifying the reference frame may be the addition of an identifying mark to each frame of the original video sequence that uniquely identifies each frame so that marks in the received reference frame 14' are compared with the marks in each received frame of the received video sequence 26 to select the corresponding frame for measurement by the measurement device 28.

Thus the present invention provides a method of selecting and transmitting to a receiver at low duty-cycle rates to provide a full quality reference frame taken from an original video sequence, which reference frame may then be compared with the corresponding frame in a received video sequence to determine the quality of the received video sequence with respect to the original video sequence.

What is claimed is:

1. A method of measuring the quality of a received video sequence at a receiver which has been processed with respect to an original video sequence from a source comprising the steps of:

selecting from the original video sequence a reference frame;

processing the original video sequence including the reference frame to produce a processed video sequence;

transmitting the reference frame at full quality and the processed video sequence to the receiver, such transmission of the reference frame starting sufficiently ahead of the transmission of the corresponding reference frame in the processed video sequence so that the transmission of the reference frame is complete prior to receipt of the corresponding reference frame in the processed video sequence arrives at the receiver as the received video sequence;

comparing the full quality transmitted reference frame with the corresponding reference frame from the received video sequence to obtain a measure of the quality of the received video sequence with respect to the original video sequence.

2. A system for measuring the quality of a received video sequence at a receiver which has been processed with respect to an original video sequence from a source comprising:

means for selecting from the original video sequence a reference frame;

means for processing the original video sequence including the reference frame to produce a processed video sequence;

means for transmitting the reference frame at full quality and the processed video sequence to the receiver, such transmission of the reference frame starting sufficiently ahead of the transmission of the corresponding reference frame in the processed video sequence so that the transmission of the reference frame is complete prior to receipt of the corresponding reference frame in the received video sequence;

means for comparing the full quality transmitted reference frame with the corresponding reference frame from the received video sequence to obtain a measure of the quality of the received video sequence with respect to the original video sequence.

* * * * *